(12) United States Patent
Alibhai et al.

(10) Patent No.: US 12,128,392 B2
(45) Date of Patent: Oct. 29, 2024

(54) CATALYST GAUZE

(71) Applicant: Johnson Matthey Public Limited Company, London (GB)

(72) Inventors: Asgar Mohamed Hussein Alibhai, West Chester, PA (US); Helen Theresa Goddin, Royston (GB)

(73) Assignee: Johnson Matthey Public Limited Company, London (GB)

( * ) Notice: Subject to any disclaimer, the term of this patent is extended or adjusted under 35 U.S.C. 154(b) by 428 days.

(21) Appl. No.: 17/594,237

(22) PCT Filed: May 20, 2020

(86) PCT No.: PCT/GB2020/051224
§ 371 (c)(1),
(2) Date: Oct. 7, 2021

(87) PCT Pub. No.: WO2020/234584
PCT Pub. Date: Nov. 26, 2020

(65) Prior Publication Data
US 2022/0143591 A1  May 12, 2022

Related U.S. Application Data

(60) Provisional application No. 62/972,361, filed on Feb. 10, 2020, provisional application No. 62/851,163, filed on May 22, 2019.

(30) Foreign Application Priority Data

Jun. 3, 2019 (GB) ..................................... 1907831

(51) Int. Cl.
*B01J 35/58* (2024.01)
*B01J 23/42* (2006.01)
*B01J 23/46* (2006.01)
*C01B 21/26* (2006.01)

(52) U.S. Cl.
CPC ............... *B01J 35/58* (2024.01); *B01J 23/42* (2013.01); *B01J 23/464* (2013.01); *C01B 21/265* (2013.01)

(58) Field of Classification Search
CPC .......... B01J 35/58; B01J 23/42; B01J 23/464; C01B 21/265
USPC ....................................................... 502/439
See application file for complete search history.

(56) References Cited

U.S. PATENT DOCUMENTS

| 2,148,680 A | 2/1939 | Brack |
| 5,108,730 A | 4/1992 | Lee et al. |
| 5,268,157 A | 12/1993 | Blass et al. |

FOREIGN PATENT DOCUMENTS

| EP | 0364153 B1 | 3/1992 |
| GB | 334466 A | 9/1930 |
| JP | H04235739 A | 8/1992 |
| RU | 2017520 C1 | 8/1994 |
| RU | 2003124443 A | 2/2005 |
| RU | 2563113 C1 | 9/2015 |
| SU | 449471 A3 | 3/1973 |
| WO | 2010/046676 A1 | 4/2010 |
| WO | 2018065271 A1 | 4/2018 |
| WO | 2018151733 A1 | 8/2018 |

*Primary Examiner* — Edward M Johnson
(74) *Attorney, Agent, or Firm* — BakerHostetler

(57) ABSTRACT

A catalyst gauze and gauze pack comprise a knitted catalyst gauze containing a first layer of a first wire material, wherein the first wire material is made from a platinum-rhodium alloy, and wherein the first layer contains an activator in the form of a second wire material which is knitted among the first wire material, and which is made from un-alloyed platinum.

12 Claims, 1 Drawing Sheet

CATALYST GAUZE

Figure 1:
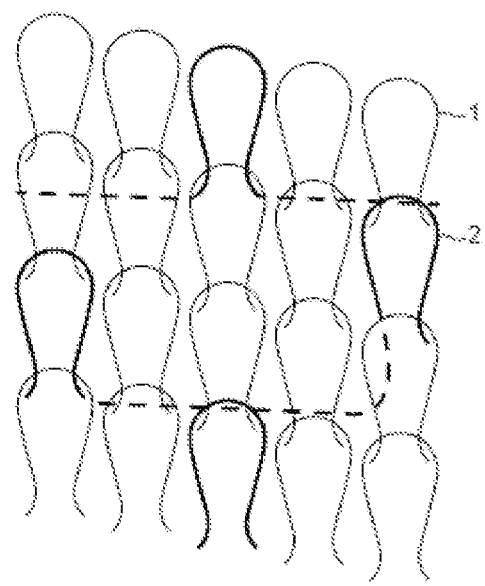

This invention relates to catalyst gauzes used in ammonia oxidation processes.

Ammonia oxidation is carried out industrially with air to generate nitric oxide, which used to make nitric acid (the Ostwald Process) and with air and methane to generate hydrogen cyanide (the Andrussow Process). In both processes, the reactant gases are mixed and passed at elevated temperature and pressure through a reaction vessel in which is placed a pack of platinum/rhodium alloy gauzes that catalyse the oxidation reactions. The gauzes are typically circular and are supported on a frame or basket that holds them perpendicular to the flow of gases through the reactor. The catalyst gauze pack may also comprise, downstream of the platinum/rhodium gauzes, one or more palladium-rich gauzes, known as "catchment gauzes" that act to capture volatilised platinum.

Whereas the platinum/rhodium gauzes provide high conversion, they can be difficult to ignite upon start-up of the process. Ignition at start-up is typically performed by combusting a hydrogen gas using a hydrogen torch directed at the surface of the gauze pack. The ammonia air mixture feed is commenced once the desired temperature is reached. Accordingly, improving start-up by providing a faster ignition at lower temperature will reduce losses of unreacted ammonia, and will avoid ignition sequence re-sets due to safety timeouts and hydrogen torch burn-through of the gauze pack.

Methods for improving the start-up by lowering the ignition temperature of platinum/rhodium alloys gauzes have been suggested. For example, GB334466 discloses weaving or inserting wires of platinum in the woven netting. Alternatively, U.S. Pat. No. 5,108,730 discloses a method for lowering the temperature for start-up of ammonia oxidation plants, comprising passing hydrogen and oxygen over platinum containing gauzes bearing a platinum coating having a surface area in excess of about 50 $cm^2/g$, thereby heating them to temperatures which are sufficient for catalytic oxidation of ammonia. Whereas Pt coatings can be effective, they are costly and time-consuming to apply, and risk exposure to platinum chemicals, which is undesirable.

More recently, WO2018151733 discloses materials for improving the ignition of gaseous reactants in metal-catalysed oxidation reactions comprising a metal catalyst gauze, preferably, a platinum/rhodium catalyst gauze, having in contact therewith, from 0.5 to 1.5 wt. %, based on the weight of the metal catalyst gauze, of one or more pieces of previously used metal catalyst gauze. Sourcing appropriate previously used gauzes and effectively incorporating them into the catalyst gauze packs is not straightforward and the inevitable variation in the properties of used gauzes will result in un-even ignition and variation between gauze packs, which is also undesirable.

We have found surprisingly that the incorporation of platinum wire in the platinum/rhodium gauzes is effective in enhancing the ignition of knitted platinum/rhodium gauzes and surprisingly is able to do so when only used as a top layer in a pack of knitted gauzes.

Accordingly the invention provides a catalyst gauze for an ammonia oxidation process, containing a first layer of knitted first wire material, wherein said first wire material is made from a platinum-rhodium alloy, characterized in that said first layer contains an activator in the form of a second wire material which is knitted among the first wire material and which is made from un-alloyed platinum.

The invention further provides a gauze pack containing the gauze and a process for the oxidation of ammonia using the gauze pack.

The activated catalyst gauze improves the reliability of start-up, enables a more rapid and uniform ignition and improves the rate at which the knitted catalyst is able to achieve full production. Without wishing to be bound by theory, this may be attributed to the knit structure providing maximum exposure of the reacting gas to the wire surface while reducing shielding of the gas at cross-over points, which is observed in woven products. Limiting the number of activated gauze layers to a top layer layer rather than a whole pack, enables control of the reaction zone and light-off location, as well as minimising platinum losses and enhancing the selectivity of the catalyst to form nitric oxide.

The first wire material is suitably made from a platinum (Pt)/rhodium (Rh) alloy containing 1 to 10% by weight Rh, preferably 3 to 10% by weight Rh. Alloys used in ammonia oxidation in the production of nitric acid or hydrogen cyanide include 10% Rh 90% Pt, 8% Rh 92% Pt, 5% Pd 5% Rh 90% Pt, 5% Rh 95% Pt and 3% Rh 97% Pt. All percentages are by weight. Alloys containing up to about 5% of iridium (Ir) may also be used in the present invention. Preferred alloys include 3% by weight Rh, "3RhPt", and 5% by weight Rh, "5RhPt". Small amounts of other metals, e.g. in the range 0.1 to 5% by weight may also be included if desired but are not preferred. Preferably, the platinum/rhodium alloys consist of just platinum and rhodium. Pt/Rh alloy wire suitable for forming gauzes is available commercially.

The second wire material is platinum that has not been alloyed with other metals. The second wire may comprise ≥99.5% by weight Pt, preferably Pt≥99.9% by weight Pt. Higher purity grades may be used but are not essential. A particularly suitable grade of Pt wire is 390Pt available from Johnson Matthey PLC.

The weight percentage of the activator second wire material in the catalyst gauze may be in the range of 1 to 45% by weight or 1 to 33% by weight or 8 to 35% by weight. Below 1% by weight, the reduction in ignition temperature is too low, whereas above 45% by weight the physical properties of the gauze are inferior and the activity and selectivity in the oxidation reaction are diminished. Furthermore, higher amounts interfere with efficient manufacturing and the gauze density is more difficult to control.

The gauzes are formed by knitting the metal wires into gauze-like structures. In one embodiment, the gauze is formed by knitting platinum and platinum/rhodium alloy wires, for example of maximum thickness from 0.02 to 0.15 mm, to provide regular looped structures. The first and second wires may have the same thickness or be of different maximum thicknesses. Herein the term "wires" includes wires that have a substantially circular cross-section and also wires that are flattened or otherwise shaped and thereby have a non-circular cross section.

Knitted gauzes are preferred because they offer a number of advantages in terms of catalyst physical properties, catalyst activity and lifetime. Knitted gauzes comprise a regular looped structure and may be formed in a variety of shapes and thicknesses using a variety of stitch types. The knitting may be accomplished using flat-bed, warp knitting or circular knitting machines. Stitches can be combined to form different patterns and knit structures, such as jersey, tricot and raschel. Reinforcing polymer fibres, for example of polyester or alginate, can be used alongside the metal wires to support the knitted structure. The polymer fibres may be readily removed after the knitting process by thermally decomposing or dissolving them. Exemplary methods are described in EP0364153 B1, herein incorporated by reference.

Whereas a single layer is effective, the gauze may comprise one or more additional layers of platinum/rhodium alloy wires that also comprise the activating platinum wire. Thus, the gauze may further comprise a second layer of a knitted third wire material, wherein said third wire material is made from a platinum-rhodium alloy and whereby said second layer contains the second wire material, knitted among the third wire material. The second layer is desirably disposed parallel to the first layer. Where a second layer is present, preferably the first wire material and the third wire material have the same composition. If desired, the second wire may additionally join the first and second layers together, for example as a pile thread that runs back and forth between the first layer and the second layer. Preferably, the gauze comprises a single layer.

The activated catalyst gauze comprising the first layer may be used on its own but the conversion at normal flowrates may be low. Therefore, preferably the activated catalyst gauze comprising the first layer is used as the top layer in a catalyst gauze pack comprising a plurality of gauzes.

Accordingly, the invention includes a catalyst gauze pack for the catalytic oxidation of ammonia to nitric oxide, comprising at least one activated catalyst gauze as described above as a top layer on a layer formed from one or more knitted gauzes made from a platinum-rich wire material having at least 85% by weight Pt, preferably at least 90% by weight Pt.

When installed in an ammonia oxidation vessel, the top layer is the layer in the pack, that is lit when initiating the oxidation reaction. In use, the reacting gases pass from the top layer vertically through the pack. A top layer consisting of a single activated catalyst gauze is preferred.

In the pack, the layer on which the activated gauze is placed preferably comprises one or more knitted gauzes made from Pt-rich alloys comprising Rh and optionally Pd. Alloys containing up to about 5% of iridium (Ir) may also be used. Small amounts of other metals, e.g. in the range 0.1 to 5% by weight may also be included if desired. Preferred Pt-rich alloys in the one or more gauzes in the layer under the activated gauze are selected from 10% Rh 90% Pt, 8% Rh 92% Pt, 5% Pd 5% Rh 90% Pt, 5% Rh 95% Pt and 3% Rh 97% Pt. All percentages are by weight. In addition, one or more knitted gauzes of a Pd—Pt alloy may be placed below the one or more knitted gauzes made from the platinum-rich wire material to reduce nitrous oxide by-product formation. Suitable Pd—Pt alloy compositions comprise 10-90% by weight of Pd, 0-5% by weight Rh, and the remainder platinum. The one or more knitted gauzes of Pd—Pt alloy are different to the one or more gauzes of Pt-rich alloy. Preferred Pd—Pt alloys contain ≥15% by weight Pd and 1-5% by weight Rh. Such gauzes are available commercially.

In ammonia oxidation plants, the number of gauzes employed can depend on the pressure at which the process is operated. For example, in a plant operating at low pressure, e.g. up to about 5 bar abs., typically less than 10, often 3 to 6, gauzes may be employed, while at higher pressures, e.g. up to 20 bar abs., a greater number of gauzes, typically greater than 20, often 30 to 45, may be employed. The gauzes, which are normally circular, may be incorporated individually into the reactor or may be pre-formed into a pack comprising a number of gauzes that may be welded together at their periphery.

Catchment gauzes based on palladium are desirably used in ammonia oxidation plants to act as so-called "getters" or collectors of platinum lost by chemical action, evaporation or other losses from the precious metal catalyst. Therefore, the catalyst pack preferably further comprises a catchment layer comprising one or more catchment gauzes of palladium or a palladium-rich alloy as a bottom layer. The bottom layer may be beneath the one or more knitted gauzes made from the platinum-rich wire material, or Pd—Pt alloy where used. The catchment gauzes may be in the form of woven or knitted gauzes. Palladium present in the catchment gauze will be able to catch platinum passing over it, hence the palladium content of the catchment gauze may be from 50 to ≥95% by weight, preferably >60% by weight, more preferably >70% by weight. Pure Pd may also be used. One or more palladium-based catchment gauzes may be used. The catchment gauzes may be provided underneath the oxidation catalyst gauzes as a separate layer or may be included as part of the catalyst gauze pack. Ceramic fibres comprising an inert refractory material, such as alumina, zirconia or the like, may if desired also be woven or knitted into catchment gauzes in addition to the palladium-based materials.

The catalyst gauze pack may be installed into an ammonia oxidation vessel by any suitable method but is conveniently installed in a so-called "basket" in which the catalyst pack is supported on the base of a squat cylindrical unit suspended within the vessel. Ammonia oxidation vessels vary in size but are typically domed cylindrical vessels with internal diameters in the range of 0.5 to 6 metres. The catalyst gauze pack may have a thickness in the range 3 to 30 cm depending on the number of gauzes and whether a catchment layer is included.

The invention includes a process for the catalytic oxidation of ammonia comprising the steps of: (i) heating a gauze pack as described above to a temperature ≥250° C. and (ii) passing a gas mixture comprising ammonia and air, and optionally methane, across the gauze pack to initiate ammonia oxidation. The heating step may be performed electrically, or with steam, or by the combustion of hydrogen, preferably by the combustion of hydrogen.

The process may be used to produce hydrogen cyanide or nitric acid but is especially suited in processes for the production of nitric acid.

In use, a mixture of ammonia and air, and optionally methane, enter the ammonia oxidation vessel through an inlet in the top. The mixture passes vertically (i.e. axially) downwards through the catalyst gauze pack where the oxidation takes place. The reacted gases, optionally after passing through a downstream catchment or particulate nitrous oxide decomposition catalyst, are then cooled by a heat exchanger, typically within the vessel. The cooled gases exit the ammonia oxidation vessel via an outlet in the base. The reacted gases may then be absorbed in water using known methods to form the desired product.

In the oxidation of ammonia to nitric oxide for the manufacture of nitric acid, the oxidation process may be operated at temperatures of 750-1000° C., particularly 850-950° C., and at pressures of 1 (low pressure) to 15 (high pressure) bar abs., with ammonia-in-air concentrations of 7-13%, often about 10%, by volume. In the oxidation of ammonia with air in the presence of methane for the manufacture of hydrogen cyanide, the operating conditions are similar.

Figure 2:
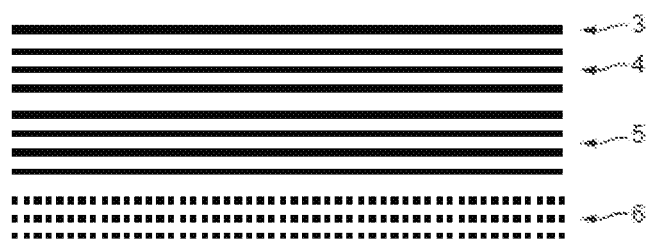

The invention is further illustrated by reference to the drawings in which:

FIG. 1 is a depiction of one embodiment of an activated knitted catalyst gauze according to the invention; and FIG. 2 is a depiction of a cross-section of a gauze pack comprising the activated knitted catalyst gauze.

In FIG. 1, the gauze is knitted in a single Jersey knit pattern using a circular knitting machine, where a first platinum-rhodium wire (1) was used in 10 of the wire feeds and a second platinum wire (2) was used in 2 of the wire feeds. The stitch pattern used was knit x1, miss x3, generating a series of float loops on the underside of the gauze. The diagram illustrates the technical face of the gauze that shows the face loops, which has been simplified for ease of understanding by hiding the float loops.

FIG. 2 shows one example a gauze pack comprising an activated ignition gauze according to the invention. The gauze pack comprises a plurality of gauzes. The activated ignition gauze (3) is uppermost, followed by a group of Pt-rich catalyst gauzes (4), high palladium gauzes (5) and finally Pd-catchment gauzes (6) at the bottom.

The invention is further illustrated by reference to the following Examples.

EXAMPLE 1

Preparation of activated platinum/rhodium gauze. A circular knitting machine was set up to knit a gauze test piece using 10 feeds of 3RhPt gauze and 2 feeds of 490Pt wire. Both wire diameters were 0.076 mm, and the two spools of 490Pt wire were positioned at opposite sides of the machine cylinder. The stitch type was the single Jersey knit pattern in FIG. 1. While the machine settings were adjusted to accommodate the change in alloy composition, finishing cleaning steps were identical to existing 3RhPt gauzes. The resulting gauze was free of defects and missing wires and was similar in density to the standard 3RhPt gauze. The amount of 390Pt wire in the gauze was 17% by weight.

EXAMPLE 2

Testing of the activated platinum/rhodium gauze. Three layers of the activated gauze, with a diameter of 25 mm, were placed inside a quartz reactor surrounded by an electric heater. A thermocouple was placed beneath the gauze to measure gas temperature. The reactor was pre-heated to 100° C. and a helium-oxygen gas was passed through the reactor at a rate of 35 L·min$^{-1}$. Ammonia was then introduced at a rate of 2 L·min$^{-1}$ and the reactor kept at a temperature of 100° C. for 30 minutes. The temperature was increased until light-off was achieved, which was defined as the point at which the increase in temperature change was greater than 0.6° C.·s$^{-1}$. Results were repeated with a standard platinum/rhodium gauze and compared.

The results shown in Table 1 illustrate the beneficial effect of including the second wire in the catalyst gauze.

TABLE 1

Ignition temperatures for activated and standard platinum/rhodium gauzes

| | Ignition Temperature (° C.) |
|---|---|
| Activated platinum/rhodium gauze | 255 |
| Standard platinum/rhodium gauze | 294 |

The invention claimed is:

1. A catalyst gauze pack for the catalytic oxidation of ammonia to nitric oxide, comprising a top layer consisting of a single activated catalyst gauze on a layer formed from one or more knitted gauzes made from a platinum-rich wire material comprising at least 85% by weight Pt, wherein the single activated catalyst gauze contains a first layer of knitted first wire material, wherein said first wire material is made from a platinum-rhodium alloy, and wherein said first layer contains an activator in the form of a second wire material which is knitted among the first wire material and which is made from un-alloyed platinum.

2. The catalyst gauze pack according to claim 1 wherein one or more knitted gauzes of a Pd—Pt alloy are placed below the one or more knitted gauzes made from the platinum-rich wire material to reduce nitrous oxide by-product formation.

3. The catalyst gauze pack according to claim 1, further comprising a catchment layer comprising one or more catchment gauzes of palladium or a palladium-rich alloy as a bottom layer.

4. A process for the catalytic oxidation of ammonia comprising the steps of: (i) heating the catalyst gauze pack according to claim 1 to a temperature ≥250° C., and (ii) passing a gas mixture comprising ammonia and air across the catalyst gauze pack to initiate ammonia oxidation.

5. The process according to claim 4 wherein the heating is performed by the combustion of hydrogen.

6. The process according to claim 4, further comprising converting the nitric oxide to nitric acid.

7. A process for the catalytic oxidation of ammonia comprising the steps of: (i) heating the catalyst gauze pack according to claim 1 to a temperature ≥250° C., and (ii) passing a gas mixture comprising ammonia and air and methane across the catalyst gauze pack to initiate ammonia oxidation.

8. The catalyst gauze pack according to claim 1, wherein the first wire material is made from a Pt—Rh alloy with 1 to 10% by weight Rh.

9. The catalyst gauze pack according to claim 1, wherein the second wire material is made from ≥99.5% by weight Pt.

10. The catalyst gauze pack according to claim 1 wherein the weight percentage of the activator second wire material in the catalyst gauze is in the range of 1 to 45% by weight.

11. The catalyst gauze pack according to claim 1, wherein the weight percentage of the activator second wire material in the catalyst gauze is in the range of 1 to 33% by weight.

12. The catalyst gauze pack according to claim 1, wherein the weight percentage of the activator second wire material in the catalyst gauze is in the range of 8 to 35% by weight.

* * * * *